US009403087B2

(12) United States Patent
Riley

(10) Patent No.: US 9,403,087 B2
(45) Date of Patent: Aug. 2, 2016

(54) SYSTEM AND METHOD OF PROVIDING ACCESS TO VIRTUAL SPACES THAT ARE ASSOCIATED WITH PHYSICAL ANALOGUES IN THE REAL WORLD

(75) Inventor: Sean Riley, San Diego, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 1628 days.

(21) Appl. No.: 12/135,832

(22) Filed: Jun. 9, 2008

(65) Prior Publication Data

US 2009/0307611 A1 Dec. 10, 2009

(51) Int. Cl.
G06F 3/00 (2006.01)
A63F 13/30 (2014.01)
G06F 17/30 (2006.01)

(52) U.S. Cl.
CPC .......... *A63F 13/12* (2013.01); *G06F 17/30029* (2013.01); *G06F 17/30041* (2013.01); *G06F 17/30061* (2013.01); *A63F 2300/5573* (2013.01); *A63F 2300/6676* (2013.01); *A63F 2300/69* (2013.01)

(58) Field of Classification Search
CPC ............. G06F 17/30029; G06F 17/30041; G06F 17/30061; G06F 3/00
USPC ................................................. 715/757, 789
See application file for complete search history.

(56) References Cited

U.S. PATENT DOCUMENTS

| 5,525,765 A | 6/1996 | Freiheit ........................... 181/30 |
| 5,736,982 A | 4/1998 | Suzuki et al. ................... 345/330 |
| 5,950,202 A | 9/1999 | Durward et al. ................ 707/10 |
| 6,009,458 A | 12/1999 | Hawkins et al. ............... 709/203 |

(Continued)

FOREIGN PATENT DOCUMENTS

| EP | 0 991 009 | 4/2000 |
| WO | WO 2005/015505 | 2/2005 |

(Continued)

OTHER PUBLICATIONS

James, Daniel and Walton, Gordon, Editors, "2004 Persistent Worlds Whitepaper", IDGA Online Games SIG, <archives.igda.org/online/IGDA_PSW_Whitepaper_2004.pdf>, 82 pages.

(Continued)

*Primary Examiner* — David Phantana Angkool
(74) *Attorney, Agent, or Firm* — Sheppard Mullin Richter & Hampton LLP

(57) ABSTRACT

A system and method for associating virtual spaces with physical analogs in the real world. Associating virtual spaces with physical analogs may enable various aspects of the virtual spaces, such as the content of the virtual spaces, the manner in which the virtual spaces are accessed by users, and/or other aspects of the virtual spaces, to correspond to the real world. For example, upon initiation of a client that provides a view of one or more virtual spaces to a user, the user may automatically be provided with a view of a virtual space associated with one or more physical analogs that are proximate to the user in the real world. As another example, content within the virtual space may reflect ambient conditions at or near associated physical analog(s), the presence and/or condition of objects at or near the associated physical analog(s), the location and/or condition of the physical analog(s), and/or other information related to the physical analog in the real world.

6 Claims, 3 Drawing Sheets

(56) References Cited

U.S. PATENT DOCUMENTS

| | | | |
|---|---|---|---|
| 6,219,045 B1 | 4/2001 | Leahy et al. | 345/331 |
| 6,289,248 B1 | 9/2001 | Conley et al. | 607/59 |
| 6,323,857 B1 | 11/2001 | Mielekamp et al. | 345/419 |
| 6,493,001 B1 | 12/2002 | Takagi et al. | 345/759 |
| 6,791,549 B2 | 9/2004 | Hubrecht et al. | 345/473 |
| 6,961,060 B1 | 11/2005 | Mochizuki et al. | 345/473 |
| 7,199,800 B2 * | 4/2007 | Ogawa | G01C 21/32 345/536 |
| 7,454,715 B2 * | 11/2008 | Chen et al. | 715/850 |
| 7,534,169 B2 * | 5/2009 | Amaitis et al. | 463/39 |
| 7,577,847 B2 * | 8/2009 | Nguyen et al. | 713/186 |
| 7,587,276 B2 * | 9/2009 | Gold et al. | 701/211 |
| 7,587,338 B2 * | 9/2009 | Owa | 705/26 |
| 7,672,778 B1 * | 3/2010 | Elliott | G01C 21/32 701/102 |
| 7,681,114 B2 * | 3/2010 | Ambrosino et al. | 715/201 |
| 7,788,323 B2 * | 8/2010 | Greenstein et al. | 709/204 |
| 7,797,261 B2 | 9/2010 | Yang | 706/45 |
| 7,827,507 B2 * | 11/2010 | Geise et al. | 715/850 |
| 7,904,577 B2 | 3/2011 | Taylor | 709/230 |
| 8,027,784 B2 * | 9/2011 | Geelen | 701/201 |
| 8,066,571 B2 | 11/2011 | Koster et al. | 463/42 |
| 8,196,050 B2 | 6/2012 | Riley et al. | 715/757 |
| 8,402,377 B2 | 3/2013 | Riley et al. | 715/757 |
| 2001/0049787 A1 | 12/2001 | Morikawa et al. | 713/156 |
| 2002/0049814 A1 | 4/2002 | Yoo | 709/205 |
| 2002/0054163 A1 | 5/2002 | Yamada et al. | 345/848 |
| 2002/0082910 A1 | 6/2002 | Kontogouris | 709/14 |
| 2002/0112033 A1 | 8/2002 | Doemling et al. | 709/219 |
| 2002/0169670 A1 | 11/2002 | Barsade et al. | 705/14 |
| 2003/0008713 A1 | 1/2003 | Ushiro et al. | 463/42 |
| 2003/0046689 A1 | 3/2003 | Gaos | 725/34 |
| 2003/0064705 A1 * | 4/2003 | Desiderio | 455/412 |
| 2003/0231212 A1 | 12/2003 | Slemmer et al. | 345/771 |
| 2004/0014527 A1 | 1/2004 | Orr et al. | 463/43 |
| 2004/0230458 A1 | 11/2004 | Takayama et al. | 705/3 |
| 2005/0033511 A1 * | 2/2005 | Pechatnikov | G01C 21/26 701/411 |
| 2005/0091111 A1 | 4/2005 | Green et al. | 705/14 |
| 2005/0160141 A1 | 7/2005 | Galley et al. | 709/204 |
| 2005/0210395 A1 | 9/2005 | Wakita et al. | 715/753 |
| 2006/0015814 A1 | 1/2006 | Rappaport et al. | 715/733 |
| 2006/0211462 A1 | 9/2006 | French et al. | 463/1 |
| 2006/0223635 A1 | 10/2006 | Rosenberg | 463/37 |
| 2006/0265483 A1 | 11/2006 | Wang et al. | 709/223 |
| 2006/0287815 A1 * | 12/2006 | Gluck | 701/208 |
| 2007/0020603 A1 | 1/2007 | Woulfe | 434/350 |
| 2007/0021213 A1 | 1/2007 | Foe et al. | 463/42 |
| 2007/0027628 A1 * | 2/2007 | Geelen | 701/213 |
| 2007/0050716 A1 | 3/2007 | Leahy et al. | 715/706 |
| 2007/0082738 A1 | 4/2007 | Fickie et al. | 463/42 |
| 2007/0083323 A1 | 4/2007 | Rosenberg | 701/200 |
| 2007/0190494 A1 | 8/2007 | Rosenberg | 434/11 |
| 2007/0288598 A1 | 12/2007 | Edeker et al. | 709/217 |
| 2008/0052054 A1 | 2/2008 | Beverina et al. | 703/6 |
| 2008/0082311 A1 | 4/2008 | Meijer et al. | 703/24 |
| 2008/0094417 A1 | 4/2008 | Cohen | 345/632 |
| 2008/0134056 A1 | 6/2008 | Shuster | 715/757 |
| 2008/0221790 A1 * | 9/2008 | Min et al. | 701/209 |
| 2008/0280684 A1 | 11/2008 | McBride et al. | 463/42 |
| 2009/0036216 A1 | 2/2009 | Ratcliff | 463/42 |
| 2009/0040186 A1 * | 2/2009 | Esenther | 345/173 |
| 2009/0077158 A1 | 3/2009 | Riley et al. | 715/202 |
| 2009/0077463 A1 | 3/2009 | Koster | 715/234 |
| 2009/0077475 A1 | 3/2009 | Koster et al. | 715/757 |
| 2009/0307226 A1 | 12/2009 | Koster et al. | 707/10 |
| 2009/0307611 A1 * | 12/2009 | Riley | 715/757 |
| 2010/0058235 A1 | 3/2010 | Borst | 715/810 |
| 2010/0094547 A1 * | 4/2010 | Geelen et al. | 701/209 |
| 2010/0095213 A1 * | 4/2010 | Koster et al. | 715/733 |
| 2012/0059881 A1 | 3/2012 | Koster et al. | 709/204 |
| 2012/0221417 A1 | 8/2012 | Riley et al. | 705/14.66 |

FOREIGN PATENT DOCUMENTS

| | | |
|---|---|---|
| WO | WO 2009/039080 | 3/2009 |
| WO | WO 2009/039084 | 3/2009 |
| WO | WO 2009/039085 | 3/2009 |
| WO | WO 2009/152074 | 12/2009 |
| WO | WO 2009/152077 | 12/2009 |
| WO | WO 2010/042783 | 4/2010 |

OTHER PUBLICATIONS

WoWWiki, Paid Character Transfer FAQ (US), Feb. 23, 2007, Blizzard Entertainment, <www.wowwiki.com/Paid_Character_Transfer_FAQ_(US)>, 6 pages.

Linden Research, Inc., "Second Life Wiki: Second Life Work/FAQs", Nov. 9, 2009, Linden Research, Inc., <http://wiki.secondlife.com/wiki/Second_Life_Work/FAQs>, 2 pages.

Blizzard Entertainment, Inc., World of Warcraft Manual 2004, Blizzard Entertainment, <willishome.com/Manual.pdf>, 114 pages.

Kumar, Sanjeev, et al., "Second Life and the New Generation of Virtual Worlds", *Computer*, vol. 41, No. 9, Sep. 2008, pp. 46-53, doi: 10.1109/MC.2008.398, http://ieeexplore.ieee.org/stamp/stamp.jsd?tp-&arnumber=4623222&isnumber=4623205, 8 pages.

Wilson, Tracy V., "How World of Warcraft Works", Nov. 16, 2007, HowStuffWorks.com, http://electronics.howstuffworks.com/world-of-warcraft.htm, Apr. 13, 2011, 4 pages.

* cited by examiner

SYSTEM AND METHOD OF PROVIDING ACCESS TO VIRTUAL SPACES THAT ARE ASSOCIATED WITH PHYSICAL ANALOGUES IN THE REAL WORLD

RELATED APPLICATIONS

This application is related to U.S. patent application Ser. No. 11/898,864, entitled "System For Providing Virtual Spaces For Access By Others," and filed Sep. 17, 2007; U.S. patent application Ser. No. 11/898,863, entitled "System For Providing Virtual Spaces With Separate Places And/Or Acoustic Areas," and filed Sep. 17, 2007; and U.S. patent application Ser. No. 11/898,861, entitled "System And Method For Embedding A View Of A Virtual Space In A Banner Ad And Enabling User Interaction With The Virtual Space Within The Banner Ad," and filed Sep. 17, 2007; and U.S. patent application Ser. No. 12/135,854, entitled "System And Method For Enabling Characters To Be Manifested Within A Plurality Of Different Virtual Spaces," and filed herewith; all of which are hereby incorporated by reference into this disclosure in their entirety.

FIELD OF THE INVENTION

The invention relates to the association of virtual spaces with physical analogues located in the real world such that access to the virtual spaces and/or content within the virtual spaces is influenced by circumstances in the real world.

BACKGROUND OF THE INVENTION

Systems that provide virtual worlds and/or virtual gaming spaces accessible to a plurality of users for real-time interaction are known. Conventional systems tend to be implemented such that the virtual worlds and/or spaces are provided without a substantial connection to the real world. Instead, these virtual worlds and/or spaces are generally self-contained, and the substance of these worlds and/or spaces tend to be independent from events and conditions in the real world. As such, information and circumstances within the virtual worlds and/or spaces, such as content, virtual conditions, virtual events, etc., tend to be somewhat discrete from goings on in the real, physical, world.

Accessing a conventional virtual world or virtual space is also typically not influenced by conditions and/or events in the real world. The space and/or world (or a specific location in a space and/or world) provided to a user attempting to access a virtual space and/or world may depend on one or more of a number of variables. These variables may include, for example, system defaults, user selection, past game-play, and/or other variables that depend on system and/or user defaults and/or selections. However, conditions or events in the real world (e.g., the physical location of a user, etc.) generally do not impact the virtual space and/or virtual world (or the specific location within a virtual space and/or virtual world) that is initially provided to the user.

SUMMARY

One aspect of the invention may relate to associating virtual spaces with physical analogues in the real world. Associating virtual spaces with physical analogues may enable various aspects of the virtual spaces, such as the content of the virtual spaces, the manner in which the virtual spaces are accessed by users, and/or other aspects of the virtual spaces, to correspond to the real world. For example, upon initiation of a client that provides a view of one or more virtual spaces to a user, the user may automatically be provided with a view of a virtual space associated with one or more physical analogues that are proximate to the user in the real world. As another example, content within the virtual space may reflect ambient conditions at or near associated physical analogue(s), the presence and/or condition of objects at or near the associated physical analogue(s), the location and/or condition of the physical analogue(s), and/or other information related to the physical analogue in the real world.

According to various embodiments, a physical analogue in the real world may include, for example, a physical location (e.g., a street, an intersection, a building, an arena, a campus, a mall, a shop, etc.) or any physical object. In some implementations, the physical object may be mobile (e.g., portable by a user, self-powered by a motor, capable of moving along water or through the air, etc.), and/or, in some implementations, animate (e.g., a person, a pet, a wild animal, a domesticated animal, etc.).

In some embodiments, a system that provides access to a plurality of virtual spaces may include a storage module, one or more servers, one or more clients, a space access processor and/or other components. The system may be configured such that information related to virtual spaces may be transmitted from the storage module to the servers, which may then execute instances of the virtual spaces based on the information received from the storage module. From an instance of a virtual space, a server may generate a view of the virtual space, and transmit the view to a client in the form of view information. The client may assemble the view from the received view information, and present a display of the view to a user.

In some implementations, the client may be configured such that upon initiation, it generates a request for access to a virtual space, and transmits the request to the space access processor. The space access processor may be configured to receive the request from the client, obtain the physical location of the client in the physical world, correlate the client with a virtual space associated with a physical analogue physically proximate to the client, and transmit information to the client that enables the client to access a server executing an instance of the correlated virtual space. A view of the correlated virtual space may then be provided to the client from the server.

A server executing an instance of a virtual space may include a location module, an instantiation module, and a view module. The server may be configured to obtain information related to the physical location of one or more clients (e.g., the client(s) accessing the virtual space, all of the clients accessing any virtual space provided by the system, etc.), physical analogues associated with virtual spaces provided by system (e.g., the virtual space being instanced), and/or other objects. The virtual space may be configured such that the instance being executed includes one or more objects that correspond to physical objects that are present in the real world at or near a physical analogue associated with the virtual space. In order to properly include such information in the executed instance, the server may rely on the obtained information related to the location of the physical objects in the real world with respect to the physical analogue.

In some embodiments of the invention, one or more unseen forces, ambient conditions, and/or other phenomena present at the physical analogue may be reflected, or otherwise accounted for, in the instance. For example, ambient weather conditions, tidal or surf conditions, snow pack conditions, ground conditions impacting footing, and/or other phenomena may be reflected in the instance. In such implementations, information related to the phenomena may be obtained by the server. The information may for example, be generated by one or more sensors present at the physical analogue, information manually entered by users and/or administrators, and/or otherwise obtained by the server.

In some implementations, physical analogues associated with a plurality of virtual spaces may become proximate to each other in the real world. This may occur where one or more of the physical analogues is mobile, and moves proximate to another physical analogue such that areas in the physical world that correspond to these two physical analogues overlap. In an implementation where the physical analogue associated with the virtual space represented in the instance being executed by the server becomes proximate with the physical analogue of another virtual space, the instance may be executed by the server such that content (e.g., objects, unseen forces, characters, topography, etc.) from the other virtual space (i.e., the virtual space associated with the now proximate physical analogue) appears in the executed instance. In order to accomplish this, the server may operate as a client within the system, and may access an instance of the other virtual space (e.g., being executed by some other server). As such, the server may receive view information that describes a view of the other virtual space, and may incorporate the content (e.g., objects, unseen forces, characters, topography, etc.) described in the view into the instance of the virtual space being executed on the server.

From the instance of the virtual space executed by the server, the server may determine a view of the virtual space. From the view of the virtual space, view information describing the view may be generated by the server and transmitted to the client to enable the client to present the view to a user. The point-of-view of the view determined by the server may be dependent, in some implementations, on the position, in the real world, of the client with respect to one or more physical analogues associated with the virtual space.

In some embodiments, the space access processor may include one or more of a request module, a user profile module, a client location module, an analogue location module, a space correlation module, a server access module, and/or other modules. A client in the system may transmit a request for access to a virtual space to the space access module. The space access processor may receive the request and obtain the location of the client in the real world. The space access processor may obtain the physical locations in the real world of the physical analogues associated with the virtual spaces provided by the system, and may correlate the client with a virtual space based on the physical locations in the real world of the client and the physical analogues. For example, the client may be correlated with a virtual space associated with a physical analogue that is proximate in the real world to the client. The space access processor may provide information to the client that enables the client to access a server executing an instance of the correlated virtual space to receive a view of the correlated virtual space from the server.

If the space access processor determines that the client present at a physical location could be correlated to physical analogues associated with two or more virtual spaces (e.g., due to proximity to a plurality of physical analogues), the space access processor may correlate the client with one of the virtual spaces based on a predetermined hierarchy of virtual spaces. The predetermined hierarchy may be determined by administrators of the system, agreements between entities associated with the virtual spaces (e.g., owners of the virtual spaces, owners of the physical objects and/or locations that are physical locations, etc.), a user preference for one or more virtual spaces, and/or otherwise determined. In some such implementations, the predetermined hierarchy may be determined by a plurality of factors (e.g., administrators of the system, as modified by one or more user preferences). In some implementations, the predetermined hierarchy may specify a default virtual space, but one or more of the other overlapping virtual spaces may be accessed by the client in response to a command input at client by the user (e.g., enabling "toggling" between virtual spaces associated with overlapping physical analogues).

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
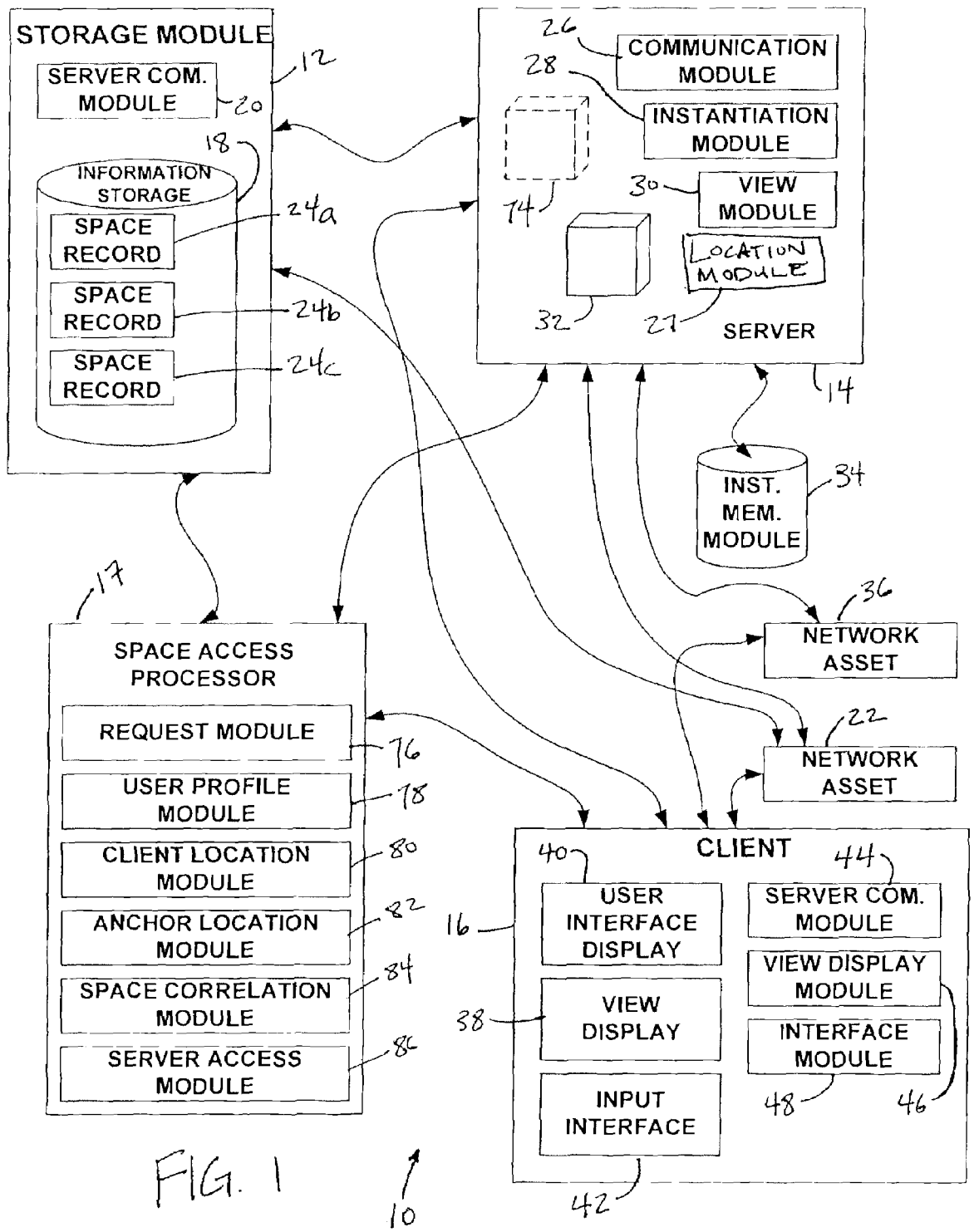
FIG. 1 illustrates a system configured to provide one or more virtual spaces that may be accessible to users, according to one or more embodiments of the invention.

FIG. 1 illustrates a system 10 configured to provide one or more virtual spaces that may be accessible to users. In some embodiments, system 10 may include a storage module 12, a server 14, a client 16, a space access processor 17 and/or other components. Storage module 12, server 14, client 16, and space access processor 17 may be in operative communication with each other. System 10 may be configured such that information related to a given virtual space may be transmitted from storage module 12 to server 14, which may then execute an instance of the virtual space. Views of the virtual space may be generated by server 14 from the instance of the virtual space. Information related to the views may be transmitted from server 14 to client 16 to enable client 16 to format the views for display to a user.

In some embodiments, one or more of the virtual spaces provided by system 10 may be associated with physical analogues in the real world. A physical analogue in the real world may include, for example, a physical location (e.g., a street, an intersection, a building, an arena, a campus, a mall, a shop, etc.) or any physical object. In some implementations, the physical object may be mobile (e.g., portable by a user, self-powered by a motor, capable of moving along water or through the air, etc.), and/or, in some implementations, animate (e.g., a person, a pet, a wild animal, a domesticated animal, etc.). System 10 may be configured such that the virtual space that is viewed by a user via client 16 may be a function of the physical location, in the real world, of the user (e.g., with respect to the physical analogues). In some implementations, the virtual space that is viewed via client 16 may be determined according to the distances, in the real world, between client 16 and the physical analogues.

System 10 may implement a markup language for communication between components (e.g., storage module 12, server 14, client 16, etc.). Information may be communicated between components via markup elements of the markup language. By virtue of communication between the components of system 10 in the markup language, various enhancements may be achieved. For example, information may be transmitted from storage module 12 to server 14 that configures server 14 to execute an instance of the virtual space may be provided to server 14 via the markup language at or near the time of instantiation. Similarly, information transmitted from server 14 to client 16 may enable client 16 to generate views of the virtual space by merely assembling the information indicated in markup elements communicated thereto. The implementation of the markup language may facilitate creation of a new virtual space by the user of client 16, and/or the customization/refinement of existing virtual spaces.

As used herein, a virtual space may comprise a simulated space (e.g., a physical space) instanced on a server (e.g., server 14) that is accessible by a client (e.g., client 16), located remotely from the server, to format a view of the virtual space for display to a user of the client. The simulated space may have a topography, express real-time interaction by the user, and/or include one or more objects positioned within the topography that are capable of locomotion within the topography. In some implementations, the topography may be a 2-dimensional topography. In other instances, the topography may be a 3-dimensional topography. In some implementations, the topography may be a single node. The topography may include dimensions of the virtual space, and/or surface features of a surface or objects that are "native" to the virtual space. In some implementations, the topography may describe a surface (e.g., a ground surface) that runs through at least a substantial portion of the virtual space. In some implementations, the topography may describe a volume with one or more bodies positioned therein (e.g., a simulation of gravity-deprived space with one or more celestial bodies positioned therein). A virtual space may include a virtual world, but this is not necessarily the case. For example, a virtual space may include a game space that does not include one or more of the aspects generally associated with a virtual world (e.g., gravity, a landscape, etc.). By way of illustration, the well-known game Tetris may be formed as a two-dimensional topography in which bodies (e.g., the falling tetrominoes) move in accordance with predetermined parameters (e.g., falling at a predetermined speed, and shifting horizontally and/or rotating based on user interaction).

As used herein, the term "markup language" may include a language used to communicate information between components via markup elements. Generally, a markup element is a discrete unit of information that includes both content and attributes associated with the content. The markup language may include a plurality of different types of elements that denote the type of content and the nature of the attributes to be included in the element. For example, in some embodiments, the markup elements in the markup language may be of the form [O_HERE]|objectId|artIndex|x|y|z|name|templateId. This may represent a markup element for identifying a new object in a virtual space. The parameters for the mark-up element include: assigning an object Id for future reference for this object, telling the client what art to draw associated with this object, the relative x, y, and z position of the object, the name of the object, and data associated with the object (comes from the template designated). As another non-limiting example, a mark-up element may be of the form [O_GONE]|objId. This mark-up element may represent an object going away from the perspective of a view of the virtual space. As yet another example, a mark-up element may be of the form [O_MOVE]|objectId|x|y|z. This mark-up element may represent an object that has teleported to a new location in the virtual space. As still another example, a mark-up element may be of the form [O_SLIDE] |objectId|x|y|z|time. This mark-up element may represent an object that is gradually moving from one location in the virtual space to a new location over a fixed period of time. It should be appreciated that these examples are not intended to be limiting, but only to illustrate a few different forms of the markup elements.

Storage module 12 may include information storage 18, a server communication module 20, and/or other components. Generally, storage module 12 may store information related to one or more virtual spaces. The information stored by storage module 12 that is related to a given virtual space may include topographical information related to the topography of the given virtual space, manifestation information related to the manifestation of one or more objects positioned within the topography and/or unseen forces experienced by the one or more objects in the virtual space, interface information related to an interface provided to the user that enables the user to interact with the virtual space, space parameter information related to parameters of the virtual space, and/or other information related to the given virtual space.

The manifestation of the one or more objects may include the locomotion characteristics of the one or more objects, the size of the one or more objects, the identity and/or nature of the one or more objects, interaction characteristics of the one or more objects, and/or other aspect of the manifestation of the one or more objects. The interaction characteristics of the one or more objects described by the manifestation information may include information related to the manner in which individual objects interact with and/or are influenced by other objects, the manner in which individual objects interact with and/or are influenced by the topography (e.g., features of the topography), the manner in which individual objects interact with and/or are influenced by unseen forces within the virtual space, and/or other characteristics of the interaction between individual objects and other forces and/or objects within the virtual space. The interaction characteristics of the one or more objects described by the manifestation information may include scriptable behaviors and, as such, the manifestation stored within storage module 12 may include one or both of a script and a trigger associated with a given scriptable behavior of a given object (or objects) within the virtual space. The unseen forces present within the virtual space may include one or more of gravity, a wind current, a water current, an unseen force emanating from one of the objects (e.g., as a "power" of the object), and/or other unseen forces (e.g., unseen influences associated with the environment of the virtual space such as temperature and/or air quality).

In some embodiments, the manifestation information may include information related to the sonic characteristics of the one or more objects positioned in the virtual space. The sonic characteristics may include the emission characteristics of individual objects (e.g., controlling the emission of sound from the objects), the acoustic characteristics of individual objects, the influence of sound on individual objects, and/or other characteristics of the one or more objects. In such embodiments, the topographical information may include information related to the sonic characteristics of the topography of the virtual space. The sonic characteristics of the topography of the virtual space may include acoustic characteristics of the topography, and/or other sonic characteristics of the topography.

According to various embodiments, content included within the virtual space (e.g., visual content formed on portions of the topography or objects present in the virtual space, objects themselves, etc.) may be identified within the information stored in storage module 12 by reference only. For example, rather than storing a structure and/or a texture associated with the structure, storage module 12 may instead store an access location at which visual content to be implemented as the structure (or a portion of the structure) or texture can be accessed. In some implementations, the access location may include a URL that points to a network location. The network location identified by the access location may be associated with a network asset 22. Network asset 22 may be located remotely from each of storage module 12, server 14, and client 16. For example, the access location may include a network URL address (e.g., an internet URL address, etc.) at which network asset 22 may be accessed.

It should be appreciated that not only solid structures within the virtual space may be identified in the information stored in storage module 12 may be stored by reference only. For example, visual effects that represent unseen forces or influences may be stored by reference as described above. Further, information stored by reference may not be limited to visual content. For example, audio content expressed within the virtual space may be stored within storage module 12 by reference, as an access location at which the audio content can be accessed. Other types of information (e.g., interface information, space parameter information, etc.) may be stored by reference within storage module 12.

The interface information stored within storage module 12 may include information related to an interface provided to the user that enables the user to interact with the virtual space. More particularly, in some implementations, the interface information may include a mapping of an input device provided at client 16 to commands that can be input by the user to system 10. For example, the interface information may include a key map that maps keys in a keyboard (and/or keypad) provided to the user at client 16 to commands that can be input by the user to system 10. As another example, the interface information may include a map that maps the inputs of a mouse (or joystick, or trackball, etc.) to commands that can be input by the user to system 10. In some implementations, the interface information may include information related to a configuration of an interface display provided to the user at client 16, through which the user may input information to system 10. For example, the interface display may receive communication to other users interacting with the virtual space, input dictating actions to be performed by one or more objects within the virtual space, a request for a different point of view for the view, a request for a more (or less) sophisticated view (e.g., a 2-dimensional view, a 3-dimensional view, etc.), a request for one or more additional types of data to be displayed in the interface display, and/or other information.

The interface display may be configured (e.g., by the interface information stored in storage module 12) to provide information to the user about conditions in the virtual space that may not be apparent simply from viewing the space. For example, such conditions may include the passage of time, ambient environmental conditions, and/or other conditions. The interface display may be configured (e.g., by the interface information stored in storage module 12) to provide information to the user about one or more objects within the space. For instance, information may be provided to the user about objects associated with the topography of the virtual space (e.g., coordinate, elevation, size, identification, age, status, etc.). In some implementations, information may be provided to the user about objects that represent animate characters (e.g., wealth, health, fatigue, age, experience, etc.). For example, such information may be displayed that is related to an object that represents an incarnation associated with client 16 in the virtual space (e.g., an avatar, a character being controlled by the user, etc.).

The space parameter information may include information related to one or more parameters of the virtual space. Parameters of the virtual space may include, for example, the rate at which time passes, dimensionality of objects within the virtual space (e.g., 2-dimensional vs. 3-dimensional), permissible views of the virtual space (e.g., first person views, bird's eye views, 2-dimensional views, 3-dimensional views, fixed views, dynamic views, selectable views, etc.), and/or other parameters of the virtual space. In some implementations, the space parameter information includes information related to the game parameters of a game provided within the virtual space. For instance, the game parameters may include information related to a maximum number of players, a minimum number of players, the game flow (e.g., turn based, real-time, etc.), scoring, spectators, and/or other game parameters of a game.

The information related to the plurality of virtual spaces may be stored in an organized manner within information storage 18. For example, the information may be organized into a plurality of space records 24 (illustrated as space record 24a, space record 24b, and space record 24c). Individual ones of space records 24 may correspond to individual ones of the plurality of virtual spaces. A given space record 24 may include information related to the corresponding virtual space. In some embodiments, the space records 24 may be stored together in a single hierarchal structure (e.g., a database, a file system of separate files, etc.). In some embodiments, space records 24 may include a plurality of different "sets" of space records 24, wherein each set of space records includes one or more of space records 24 that is stored separately and discretely from the other space records 24.

Although information storage 18 is illustrated in FIG. 1 as a single entity, this is for illustrative purposes only. In some embodiments, information storage 18 includes a plurality of informational structures that facilitate management and storage of the information related to the plurality of virtual spaces. Information storage 18 may include the physical storage elements for storing the information related to the virtual spaces and/or the information processing and storage assets that enable information storage 18 to manage, organize, and maintain the stored information. Information storage 18 may include a relational database, an object oriented database, a hierarchical database, a post-relational database, flat text files (which may be served locally or via a network), XML files (which may be served locally or via a network), and/or other information structures.

In some embodiments, in which information storage 18 includes a plurality of informational structures that are separate and discrete from each other. In such embodiments, system 10 may include a central information catalog (e.g., managed by storage module 12) that includes information related to the location of the space records included information storage 18 (e.g., network and/or file system addresses of individual space records). In some embodiments, the central information catalog may form a clearing house of information that enables users to initiate instances a chosen virtual space (e.g., to establish a server executing an instance of the chosen virtual space similar to server 14). Accordingly, access to the information stored within the central information catalog may be provided to users based on privileges (e.g., earned via monetary payment, administrative privileges, earned via previous game-play, earned via membership in a community, etc.).

Server communication module 20 may facilitate communication between information storage 18 and server 14. In some embodiments, server communication module 20 enables this communication by formatting communication between information storage 18 and server 14. This may include, for communication transmitted from information storage 18 to server 14, generating markup elements (e.g., "tags") that convey the information stored in information storage 18, and transmitting the generated markup elements to server 14. For communication transmitted from server 14 to information storage 18, server communication module 20 may receive markup elements transmitted from server 14 to storage module 12 and may reformat the information for storage in information storage 18.

Server 14 may be provided remotely from storage module 12. Communication between server 14 and storage module 12 may be accomplished via one or more communication media. For example, server 14 and storage module 12 may communicate via a wireless medium, via a hard-wired medium, via a network (e.g., wireless or wired), and/or via other communication media. In some embodiments, server 14 may include a communication module 26, a location module 27, an instantiation module 28, a view module 30, and/or other modules. Modules 26, 27, 28, and 30 may be implemented in software; hardware; firmware; some combination of software, hardware, and/or firmware; and/or otherwise implemented. It should be appreciated that although modules 26, 27, 28, and/ or 30 are illustrated in FIG. 1 as being co-located within a single unit (server 14), in some implementations, server 14 may include multiple units and modules 26, 27, 28, and/or 30 may be located remotely from the other modules.

Communication module 26 may be configured to communicate with storage module 12, processor 17, and/or client 16. Communicating with storage module 12, processor 17, and/ or client 16 may include transmitting and/or receiving markup elements of the markup language. The markup elements received by communication module 26 may be implemented by other modules of server 14, or may be passed between storage module 12 and client 16 via server 14 (as server 14 serves as an intermediary therebetween). The markup elements transmitted by communication module 26 to storage module 12 or client 16 may include markup elements being communicated from storage module to client 16 (or vice versa), or the markup elements may include markup elements generated by the other modules of server 14.

Location module 27 may obtain information related to the physical location of client 16 (and/or other clients included in system 10), physical analogues associated with virtual spaces provided by system 10, and/or other objects. Location module 27 may obtain this information directly from the clients and/or physical analogues, from some other module tracking or storing the physical locations of clients and/or physical analogues (e.g., storage module 12, and/or client location module 80 and/or analogue location module 82 discussed below). The information obtained by location module 27 may be implemented by one or both of instantiation module 28 and/or view module 30 in the manner described below.

Instantiation module 28 may be configured to execute one or more instances of one or more virtual spaces, such as an instance 32 of a virtual space present on server 14. Instantiation module 28 may execute instance 32 of the virtual space according to information received in markup element form from storage module 12. Instantiation module 28 may comprise an application that is configured to execute instances of virtual spaces based on information conveyed thereto in markup element form. The application may be capable of initiating execution of an instance of a virtual space without accessing a local source of information (local to server 14) that describes various aspects of the configuration of the virtual space (e.g., manifestation information, space parameter information, etc.), or without making assumptions about such aspects of the configuration of the virtual space when initiating execution of the virtual space. Instead, such information may be obtained by instantiation module 28 from the markup elements communicated to server 14 from storage module 12. This may provide one or more enhancements over systems in which an application running on a server executes an instance of a virtual space dictates aspects of the virtual space (e.g., in "World of Warcraft"), such as manifestation information and/or space parameter information, or makes assumptions about such aspects. For example, the application included in instantiation module 28 may be capable of executing instances of a wider variety of "types" of virtual spaces (e.g., virtual worlds, games, 3-D spaces, 2-D spaces, spaces with different views, first person spaces, birds-eye spaces, real-time spaces, turn based spaces, etc.).

Instance 32 may be characterized as a simulation of the virtual space that is being executed on server 14 by instantiation module 30. The simulation may include determining in real-time the positions, structure, and manifestation of objects, unseen forces, and topography within the virtual space according to the topography, manifestation, and space parameter information that corresponds to the virtual space. As has been discussed above, various portions of the content that make up the virtual space embodied in instance 32 may be identified in the markup elements received from storage module 12 by reference. In such implementations, instantiation module 28 may be configured to access the content at the access location identified (e.g., at network asset 22, as described above) in order to account for the nature of the content in instance 32.

As instance 32 is maintained by instantiation module 28 on server 14, and the position, structure, and manifestation of objects, unseen forces, and topography within the virtual space varies, instantiation module 28 may implement an instance memory module 34 to store information related to the present state of instance 32. Instance memory module 34 may be provided locally to server 14 (e.g., integrally with server 14, locally connected with server 14, etc.), or instance memory module 34 may be located remotely from server 14 and an operative communication link may be formed therebetween.

In some implementations, instance 32 may be an instance of a virtual space that is associated with a physical analogue in the real world. In such implementations, instance 32 may include one or more objects that correspond to physical objects that are present in the real world at or near the physical analogue. For example, instance 32 may include objects associated with users (e.g., avatars, etc.) operating clients (e.g., client 16) at or near the physical analogue. In order to properly incorporate this information into instance 32, instantiation module 28 may obtain information related to the location of the physical objects in the real world with respect to the physical analogue. For instance, instantiation module 28 may obtain information related to the physical location of clients (e.g., client 16) that are currently operating in system 10, to account for the position of the users of these clients in instance 32 (e.g., from location module 27). In some implementations, instance 32 may only reflect the position of clients (e.g., client 16) that are currently receiving views of instance 32. In some implementations, instance 32 may reflect the position of clients without regard for whether they are currently receiving views of instance 32, some other instance of the virtual space of instance 32 or other virtual space, or are otherwise in communication with system 10.

Similarly, one or more unseen forces, ambient conditions, and/or other phenomena present at the physical analogue may be reflected, or otherwise accounted for, in instance 32. For example, ambient weather conditions, tidal or surf conditions, snow pack conditions, ground conditions impacting footing, and/or other phenomena may be reflected in instance 32. In such implementations, information related to the phenomena may be obtained by instantiation module 28. The information may be generated by one or more sensors present at the physical analogue, information manually entered by users and/or administrators, and/or otherwise obtained.

In some implementations, physical analogues associated with a plurality of virtual spaces may become proximate to each other in the real world. This may occur where one or more of the physical analogues is mobile, and moves proximate to another physical analogue such that the areas in the physical world that correspond to these two physical analogues overlap. In an implementation where the physical analogue associated with the virtual space represented in instance 32 becomes proximate with the physical analogue of another virtual space, instance 32 may be executed by instantiation module 28 such that content (e.g., objects, unseen forces, characters, topography, etc.) from the other virtual space appears in instance 32. In order to accomplish this, instantiation module 28 may operate as a client, and may access an instance of the other virtual space being executed on a server (e.g., server 14 or some other server). As such, instantiation module 28 may receive view information that describes a view of the other virtual space, and may incorporate the content (e.g., objects, unseen forces, characters, topography, etc.) described in the view into instance 32. Upon incorporation of the content of the other virtual space into instance 32, instance 32 effectively includes the content of the other virtual space as well as its own.

By way of non-limiting example, a virtual space may be associated with a person as a physical analogue in the real world. This "personal" virtual space may include, for example, information about the person (e.g., identification, mood, strength, fatigue, etc.), and may include an object associated with the person (e.g., an avatar, accoutrements for an avatar, etc.). If the person comes into proximity with the physical analogue of the virtual space represented in instance 32, instantiation module 28 may access a server executing an instance of the personal virtual space, and receive view information and/or interface information that describes the personal virtual space. This view/interface information may then be incorporated into instance 32 to enable instance 32 to effectively include the personal virtual space within instance 32.

In some embodiments, the inclusion of one virtual space within another, due to the proximity of the physical analogues associated therewith, may be carried out in accordance with a predetermined hierarchy of virtual spaces. The predetermined hierarchy may be determined by administrators of system 10, agreements between entities associated with the virtual spaces (e.g., owners of the virtual spaces, owners of the physical objects and/or locations that are physical locations, etc.), a user preference for one or more virtual spaces, and/or otherwise determined. In some such implementations, the predetermined hierarchy may be determined by a plurality of factors (e.g., administrators of system 10, as modified by one or more user preferences). Further, a permission of the virtual space "including" another virtual space (e.g., the virtual space of instance 32 in the example immediately above) and/or a permission of the virtual space to be "included" in another virtual space (e.g., the personal virtual space in the example above) may be required before instantiation module 28 provides the content of another virtual space within instance 32.

As a non-limiting example, a person that has a personal virtual space (e.g., where the person is the physical analogue for the virtual space, as discussed above) may only provide permission for a pre-selected set of virtual spaces and/or types of virtual spaces to include the content of her personal virtual space. During operation, this pre-selected set of virtual spaces may be augmented by prompting the person (e.g., via a client similar to client 16, etc.) as she comes into proximity with physical analogues associated with virtual spaces that are not part of the pre-selected set. Similarly, the virtual space associated with instance 32 may only provide permission for including content from a pre-selected set of virtual spaces. This set of pre-selected virtual spaces may be augmented, for example by prompting an administrator of the virtual space (or other entity associated with the virtual space) associated with instance 32.

View module 30 may be configured to implement instance 32 to determine a view of the virtual space. The view of the virtual space may be from a fixed location or may be dynamic (e.g., may track an object). In some implementations, an incarnation associated with client 16 (e.g., an avatar) may be included within instance 32. In these implementations, the location of the incarnation may influence the view determined by view module 30 (e.g., track with the position of the incarnation, be taken from the perspective of the incarnation, etc.). In some implementations, the physical location of client 16 in the real world may influence the view determined by view module 30. For example, view module 30 may obtain information related to the physical location of client 16 in the real world (e.g., from location module 27), and the view of the virtual space determined by view module 30 may track with the position, in the real world, of client 16 with respect to a physical analogue with which the virtual space is associated. The view determined by view module 30 may be determined for a variety of different perspectives (e.g., a bird's eye view, an elevation view, a first person view, etc.). The view may be a 2-dimensional view or a 3-dimensional view. These and/or other aspects of the view may be determined for the virtual space based on information stored in a space record 24 for the virtual space and provided from storage module 12 via markup elements (e.g., as space parameter information). Determining the view may include determining the identity, shading, size (e.g., due to perspective), motion, and/or position of objects, effects, and/or portions of the topography that would be present in a rendering of the view.

View module 30 may generate a plurality of markup elements that describe the view based on the determination of the view. The plurality of markup elements may describe identity, shading, size (e.g., due to perspective), and/or position of the objects, effects, and/or portions of the topography that should be present in a rendering of the view. The markup elements may describe the view "completely" such that the view can be formatted for viewing by the user by simply assembling the content identified in the markup elements according to the attributes of the content provided in the markup elements. In such implementations, assembly alone may be sufficient to achieve a display of the view of the virtual space, without further processing of the content (e.g., to determine motion paths, decision-making, scheduling, triggering, etc.).

In some embodiments, the markup elements generated by view module 30 that describe the view identify content (e.g., visual content, audio content, etc.) to be included in the view by reference only. For example, as was the case with markup elements transmitted from storage module 12 to server 14, the markup elements generated by view module 30 may identify content by a reference to an access location. The access location may include a URL that points to a network location. The network location identified by the access location may be associated with a network asset (e.g., network asset 22). For instance, the access location may include a network URL address (e.g., an internet URL address, etc.) at which network asset 22 may be accessed.

According to various embodiments, in generating the view, view module 30 may manage various aspects of content included in views determined by view module 30, but stored remotely from server 14 (e.g., content referenced in markup elements generated by view module 30). Such management may include re-formatting content stored remotely from server 14 to enable client 16 to convey the content (e.g., via display, etc.) to the user. For example, in some implementations, client 16 may be executed on a relatively limited platform (e.g., a portable electronic device with limited processing, storage, and/or display capabilities). Server 14 may be informed of the limited capabilities of the platform (e.g., via communication from client 16 to server 14) and, in response, view module 30 may access the content stored remotely in network asset 22 to re-format the content to a form that can be conveyed to the user by the platform executing client 16 (e.g., simplifying visual content, removing some visual content, re-formatting from 3-dimensional to 2-dimensional, etc.). In such implementations, the re-formatted content may be stored at network asset 22 by over-writing the previous version of the content, stored at network asset 22 separately from the previous version of the content, stored at a network asset 36 that is separate from network asset 22, and/or otherwise stored. In implementations in which the re-formatted content is stored separately from the previous version of the content (e.g., stored separately at network asset 22, stored at network asset 24, cached locally by server 14, etc.), the markup elements generated by view module 30 for client 16 reflect the access location of the re-formatted content.

As was mentioned above, in some embodiments, view module 30 may adjust one or more aspects of a view of instance 32 based on communication from client 16 indicating that the capabilities of client 16 may be limited in some manner (e.g., limitations in screen size, limitations of screen resolution, limitations of audio capabilities, limitations in information communication speeds, limitations in processing capabilities, etc.). In such embodiments, view module 30 may generate markup elements for transmission that reduce (or increase) the complexity of the view based on the capabilities (and/or lack thereof) communicated by client 16 to server 14. For example, view module 30 may remove audio content from the markup elements, view module 30 may generate the markup elements to provide a two dimensional (rather than a three dimensional) view of instance 32, view module 30 may reduce, minimize, or remove information dictating motion of one or more objects in the view, view module 30 may change the point of view of the view (e.g., from a perspective view to a bird's eye view), and/or otherwise generate the markup elements to accommodate client 16. In some implementations, these types of accommodations for client 16 may be made by server 14 in response to commands input by a user on client 16 as well as or instead of based on communication of client capabilities by client 16. For example, the user may input commands to reduce the load to client 16 caused by displaying the view to improve the quality of the performance of client 16 in displaying the view, to free up processing and/or communication capabilities on client 16 for other functions, and/or for other reasons.

From the description above it should be apparent that as view module 30 "customizes" the markup elements that describe the view for client 16, a plurality of different versions of the same view may be described in markup elements that are sent to different clients with different capabilities, settings, and/or requirements input by a user. This customization by view module 30 may enhance the ability of system 10 to be implemented with a wider variety of clients and/or provide other enhancements.

In some embodiments, client 16 provides an interface to the user that includes a view display 38, a user interface display 40, an input interface 42, and/or other interfaces that enable interaction of the user with the virtual space. Client 16 may include a server communication module 44, a view display module 46, an interface module 48, and/or other modules. Client 16 may be executed on a computing platform that includes a processor that executes modules 44 and 46, a display device that conveys displays 38 and 40 to the user, and provides input interface 42 to the user to enable the user to input information to system 10 (e.g., a keyboard, a keypad, a switch, a knob, a lever, a touchpad, a touchscreen, a button, a joystick, a mouse, a trackball, etc.). The platform may include a desktop computing system, a gaming system, or more portable systems (e.g., a mobile phone, a personal digital assistant, a hand-held computer, a laptop computer, etc.). In some embodiments, client 16 may be formed in a distributed manner (e.g., as a web service). In some embodiments, client 16 may be formed in a server. In these embodiments, a given virtual space instanced on server 14 may include one or more objects that present another virtual space (of which server 14 becomes the client in determining the views of the first given virtual space).

Server communication module 44 may be configured to receive information related to the execution of instance 32 on server 14 from server 14. For example, server communication module 44 may receive markup elements generated by storage module 12 (e.g., via server 14), view module 30, and/or other components or modules of system 10. The information included in the markup elements may include, for example, view information that describes a view of instance 32 of the virtual space, interface information that describes various aspects of the interface provided by client 16 to the user, and/or other information. Server communication module 44 may communicate with server 14 via one or more protocols such as, for example, WAP, TCP, UDP, and/or other protocols. The protocol implemented by server communication module 44 may be negotiated between server communication module 44 and server 14.

View display module 48 may be configured to format the view described by the markup elements received from server 14 for display on view display 38. Formatting the view described by the markup elements may include assembling the view information included in the markup elements. This may include providing the content indicated in the markup elements according to the attributes indicated in the markup elements, without further processing (e.g., to determine motion paths, decision-making, scheduling, triggering, etc.). As was discussed above, in some implementations, the content indicated in the markup elements may be indicated by reference only. In such implementations, view display module 46 may access the content at the access locations provided in the markup elements (e.g., the access locations that reference network assets 22 and/or 36, or objects cached locally to server 14). In some of these implementations, view display module 46 may cause one or more of the content accessed to be cached locally to client 16, in order to enhance the speed with which future views may be assembled. The view that is formatted by assembling the view information provided in the markup elements may then be conveyed to the user via view display 38.

As has been mentioned above, in some implementations, the capabilities of client 16 may be relatively limited. In some such implementations, client 16 may communicate these limitations to server 14, and the markup elements received by client 16 may have been generated by server 14 to accommodate the communicated limitations. However, in some such implementations, client 16 may not communicate some or all of the limitations that prohibit conveying to the user all of the content included in the markup elements received from server 14. Similarly, server 14 may not accommodate all of the limitations communicated by client 16 as server 14 generates the markup elements for transmission to client 16. In these instances, view display module 48 may be configured to exclude or alter content contained in the markup elements in formatting the view. For example, view display module 48 may disregard audio content if client 16 does not include capabilities for providing audio content to the user. As another example, if client 16 does not have the processing and/or display resources to convey movement of objects in the view, view display module 48 may restrict and/or disregard motion dictated by motion information included in the markup elements.

Interface module 48 may be configured to configure various aspects of the interface provided to the user by client 16. For example, interface module 48 may configure user interface display 40 and/or input interface 42 according to the interface information provided in the markup elements. User interface display 40 may enable display of the user interface to the user. In some implementations, user interface display 40 may be provided to the user on the same display device (e.g., the same screen) as view display 38. As was discussed above, the user interface configured on user interface display 40 by interface module 38 may enable the user to input communication to other users interacting with the virtual space, input actions to be performed by one or more objects within the virtual space, provide information to the user about conditions in the virtual space that may not be apparent simply from viewing the space, provide information to the user about one or more objects within the space, and/or provide for other interactive features for the user. In some implementations, the markup elements that dictate aspects of the user interface may include markup elements generated at storage module 12 (e.g., at startup of instance 32) and/or markup elements generated by server 14 (e.g., by view module 30) based on the information conveyed from storage module 12 to server 14 via markup elements.

In some implementations, interface module 48 may configure input interface 42 according to information received from server 14 via markup elements. For example, interface module 48 may map the manipulation of input interface 42 by the user into commands to be input to system 10 based on a predetermined mapping that is conveyed to client 16 from server 14 via markup elements. The predetermined mapping may include, for example, a key map and/or other types of interface mappings (e.g., a mapping of inputs to a mouse, a joystick, a trackball, and/or other input devices). If input interface 42 is manipulated by the user, interface module 48 may implement the mapping to determine an appropriate command (or commands) that correspond to the manipulation of input interface 42 by the user. Similarly, information input by the user to user interface display 40 (e.g., via a command line prompt) may be formatted into an appropriate command for system 10 by interface module 48. In some implementations, the availability of certain commands, and/or the mapping of such commands may be provided based on privileges associated with a user manipulating client 16 (e.g., as determined from a login). For example, a user with administrative privileges, premium privileges (e.g., earned via monetary payment), advanced privileges (e.g., earned via previous game-play), and/or other privileges may be enabled to access an enhanced set of commands. These commands formatted by interface module 48 may be communicated to server 14 by server communication module 44.

Upon receipt of commands from client 16 that include commands input by the user (e.g., via communication module 26), server 14 may enqueue for execution (and/or execute) the received commands. The received commands may include commands related to the execution of instance 32 of the virtual space. For example, the commands may include display commands (e.g., pan, zoom, etc.), object manipulation commands (e.g., to move one or more objects in a predetermined manner), incarnation action commands (e.g., for the incarnation associated with client 16 to perform a predetermined action), communication commands (e.g., to communicate with other users interacting with the virtual space), and/or other commands. Instantiation module 38 may execute the commands in the virtual space by manipulating instance 32 of the virtual space. The manipulation of instance 32 in response to the received commands may be reflected in the view generated by view module 30 of instance 32, which may then be provided back to client 16 for viewing. Thus, commands input by the user at client 16 enable the user to interact with the virtual space without requiring execution or processing of the commands on client 16 itself.

Figure 2:
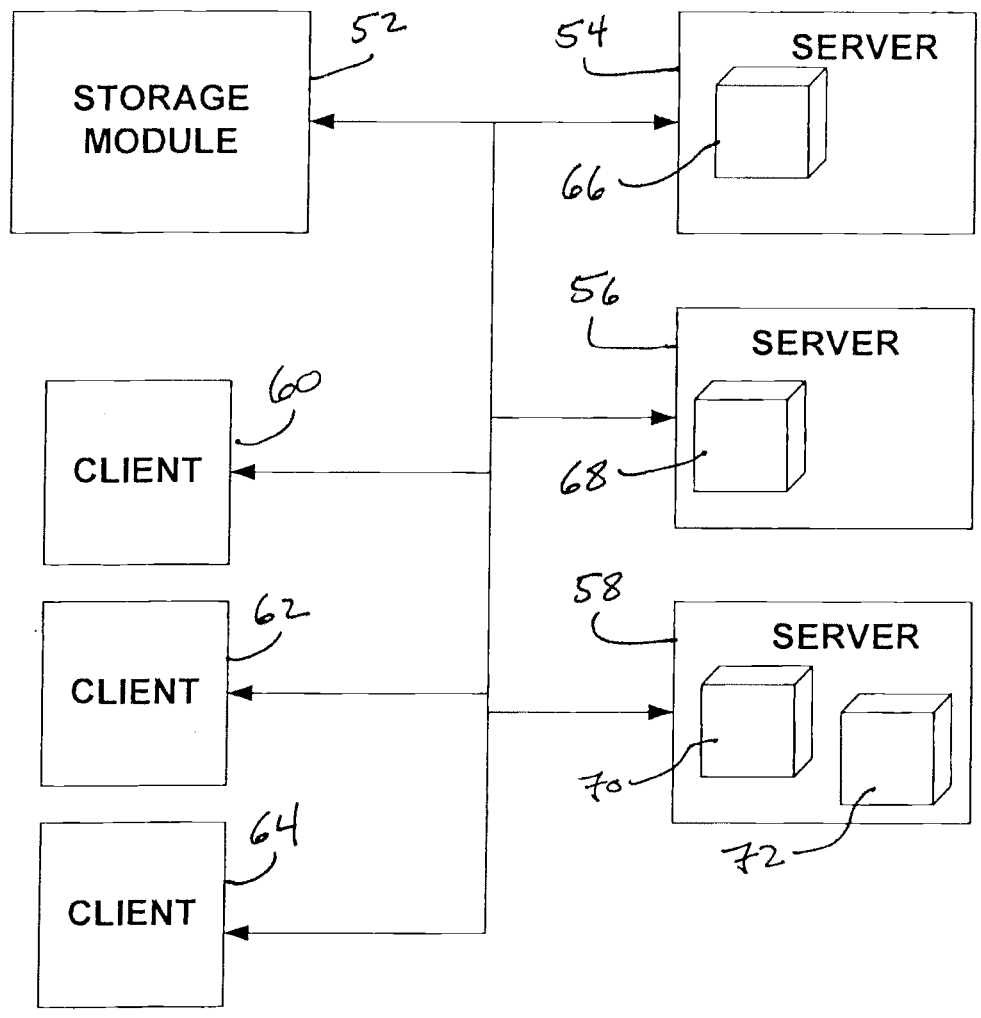
FIG. 2 illustrates a system configured to provide one or more virtual spaces that may be accessible to users, according to one or more embodiments of the invention.

It should be that system 10 as illustrated in FIG. 1 is not intended to be limiting in the numbers of the various components and/or the number of virtual spaces being instanced. For example, FIG. 2 illustrates a system 50, similar to system 10, including a storage module 52, a plurality of servers 54, 56, and 58, and a plurality of clients 60, 62, and 64. Storage module 52 may perform substantially the same function as storage module 12 (shown in FIG. 1 and described above). Servers 54, 56, and 58 may perform substantially the same function as server 14 (shown in FIG. 1 and described above). Clients 60, 62, and 64 may perform substantially the same function as client 16 (shown in FIG. 1 and described above).

Storage module 52 may store information related to a plurality of virtual spaces, and may communicate the stored information to servers 54, 56, and/or 58 via markup elements of the markup language, as was discussed above. Servers 54, 56, and/or 58 may implement the information received from storage module 52 to execute instances 66, 68, 70, and/or 70 of virtual spaces. As can be seen in FIG. 2, a given server, for example, server 58, may be implemented to execute instances of a plurality of virtual spaces (e.g., instances 70 and 72). Clients 60, 62, and 64 may receive information from servers 54, 56, and/or 58 that enables clients 60, 62, and/or 64 to provide an interface for users thereof to one or more virtual spaces being instanced on servers 54, 56, and/or 58. The information received from servers 54, 56, and/or 58 may be provided as markup elements of the markup language, as discussed above.

Due at least in part to the implementation of the markup language to communicate information between the components of system 50, it should be appreciated from the foregoing description that any of servers 54, 56, and/or 58 may instance any of the virtual spaces stored on storage module 52. The ability of servers 54, 56, and/or 58 to instance a given virtual space may be independent, for example, from the topography of the given virtual space, the manner in which objects and/or forces are manifest in the given virtual space, and/or the space parameters of the given virtual space. This flexibility may provide an enhancement over conventional systems for instancing virtual spaces, which may only be capable of instancing certain "types" of virtual spaces. Similarly, clients 60, 62, and/or 64 may interface with any of the instances 66, 68, 70, and/or 72. Such interface may be provided without regard for specifics of the virtual space (e.g., topography, manifestations, parameters, etc.) that may limit the number of "types" of virtual spaces that can be provided for with a single client in conventional systems. In conventional systems, these limitations may arise as a product of the limitations of platforms executing client 16, limitations of client 16 itself, and/or other limitations.

Returning to FIG. 1, space access processor 17 may be configured to manage information related to the location of instances of virtual spaces (e.g., network addresses of servers executing instances of the virtual spaces), information related to the physical analogues associated with the virtual spaces, information related to the physical location of clients attempting to access the virtual spaces, information related to users of system 10, and/or other information. More specifically, space access processor 17 may be configured to manage this information to ensure that a client (e.g., client 16) attempting to access a virtual space to provide a view of the virtual space to the user is directed to the appropriate virtual space (e.g., based on the physical location of the user, etc.). As such, space access processor 17 may include one or more of a digital processor, an analog processor, a digital circuit designed to process information, an analog circuit designed to process information, a state machine, and/or other mechanisms for electronically processing information.

Although processor 17 is shown in FIG. 1 as a single entity, this is for illustrative purposes only. In some implementations, processor 17 may include a plurality of processing entities. These processing entities may be physically located within the same device, or processor 17 may represent processing functionality of a plurality of devices operating in coordination.

In some implementations, some or all of the functionality attributed herein to space access processor 17 may be provided by a device (or devices) also providing the functionality of one or more other components of system 10. For instance, space access processor 17 and storage module 12 may include a device (or devices) in common.

Communication between space access processor 17 and one or more other components of system 10 (e.g., storage module 12, server 14, client 16, etc.) may be accomplished via one or more communication links. For example, server 14 and storage module 12 may communicate via a wireless medium, via a hard-wired medium, via a network (e.g., wireless or wired), and/or via other communication links. In some embodiments, space access processor 17 may include a request module 76, a user profile module 78, a client location module 80, an analogue location module 82, a space correlation module 84, a server access module 86, and/or other modules. Modules 76, 78, 80, 82, 84, and/or 86 may be implemented in software; hardware; firmware; some combination of software, hardware, and/or firmware; and/or otherwise implemented. It should be appreciated that although modules 76, 78, 80, 82, 84, and/or 86 are illustrated in FIG. 1 as being co-located within a single entity (space access processor 17), in some implementations, space access processor 17 may include multiple entities, and one or more of modules 76, 78, 80, 82, 84, and/or 86 may be located remotely from the other modules.

In some embodiments, request module 76 may be configured to receive a request from client 16 for access to a virtual space. In some implementations, a request from client 16 may be generated for request module 76 automatically by client 16 upon invocation. In some implementations, a request from client may be generated in response to a command input to client 16 (e.g., via interface module 48). The request may be communicated from request module 76 to client 16 via a HyperText Transfer Protocol, a Domain Name System communication, and/or other protocols and/or formats.

Request module 76 may be configured to identify client 16 and/or a user controlling client 16. For example, the request received by request module 76 (and/or subsequent communication between request module 76 and client 16) may include an identifier (e.g., a username, an ID number, a user login, etc.) that request module 76 may implement to identify client 16 and/or the user. The identification may be secure. To enable a secure identification by request module 76, the request received from client 16 (and/or subsequent communication between request module 76 and client 16) may include a password, or other security token, that enables authentication of client 16 and/or the user by request module 76.

In some embodiments, user profile module 78 may be configured to manage user profiles of users of system 10 (e.g., a user accessing a virtual space via client 16). The user profile of a given user may store information related to the given user. This information may include one or more of payment information (e.g., a method of payment), subscription information (e.g., one or more virtual spaces to which the user subscribes), demographic information, information related to one or more preferences of the user (e.g., preferred control schemes via elements 40, 42, and/or 48), preferred virtual spaces, preferred servers that execute instances of virtual spaces, etc.), authorization information (e.g., authorization to access a virtual space, a zone within a virtual space, etc.), account information, and/or other information related to the given user.

According to various embodiments, client location module 80 may be configured to obtain the physical location in the real world of client 16. This may include receiving a transmission of information related to the physical location of client 16, and determining the physical location of client 16 from this information. The transmission may include information generated by client 16 and/or a server, a transceiver, and/or other device (or devices) in communication with client 16. The information related to the physical location of client 16 may include some form of geolocation information that specifies the physical location of client 16. For example, the information related to the physical location of client 16 may include one or more of Internet protocol address, MAC address, RFID information, Wi-Fi connection location, GPS coordinates, information entered to client 16 by a user (e.g., specifying the location of client 16), and/or other information.

In some embodiments, analogue location module 82 may be configured to obtain the physical locations in the real world of the physical analogues associated with the virtual spaces. One or more of the physical analogues may be located at relatively fixed locations in the real world. Obtaining the physical location of these physical analogues may include receiving the physical location via user input, via a database, over a network, etc. One or more of the physical analogues may be mobile. For example, a physical analogue may be an object that is portable, an object capable of powered movement, and/or an animate object capable of living motion. Obtaining the physical location of a given one of these physical analogues may include receiving an identification of the physical location of the given physical analogue (e.g., from the physical analogue, from a locator module in communication with the physical analogue, etc.), receiving a transmission of information related to the physical location of the given physical analogue and determining the physical location of the given physical analogue from this information, and/or otherwise obtaining the physical location of the given physical analogue.

In some embodiments, space correlation module 84 may be configured to correlate client 16 with one of the virtual spaces provided by system 10. This correlation may be based on one or more factors including, for instance, the physical location in the real world of client 16, the physical location in the real world of the physical analogues associated with the virtual spaces, information related to the user of client 16 stored in a user profile, and/or other factors. By way of non-limiting example, if the physical location of client 16 corresponds with the physical location of the physical analogue associated with a given one of the virtual spaces, then client 16 may be correlated with the given virtual space. In some implementations, space correlation module 84 may determine which of the physical analogues is closest, in the real world, to the physical location of client 16, and may correlate client 16 with the associated virtual space. In some implementations, a physical analogue may correspond to a zone (e.g., within a predefined boundary, within a threshold distance to the physical analogue, etc.) in the real world, and if client 16 is determined to be within the zone, then space correlation module 84 may correlate client 16 with the virtual space associated with the physical analogue.

As was mentioned above, in some implementations, information stored in a user profile that corresponds to the user of client 16 may influence the correlation of client 16 with a virtual space. For example, space correlation module 84 may obtain an identity of the user from request module 76, and may access a user profile associated with the identified user that is stored and/or managed by user profile module 78. Based on the information stored therein (e.g., subscriptions, invitations, rewards, privileges, preferences, etc.), space correlation module 84 may determine which of the virtual spaces that the identified user should be given access to, and may correlate client 16 with an appropriate virtual space. As should be appreciated, this may enable the creation of virtual spaces that are restricted for one or more reasons. For example, a given virtual space may be restricted to users with a predetermined skill level (e.g., earned through gameplay), invited users, paying users, and/or other sets of users.

In some embodiments, server access module 86 may be configured to generate a network location (e.g., a URL, a location within a network directory, etc.) at which client 16 will be able to access a server (e.g., server 14) executing an instance of the virtual space correlated with client 16 by space correlation module 84. Accessing the server at the location generated by server access module 86 enables client 16 to receive views of the instance of the virtual space being executed by the server. In some implementations, to provide this functionality, server access module 86 may maintain a record of all of the servers that are executing instances of virtual spaces, the identities of the virtual spaces that have instances being executed, and the network locations at which these servers can be accessed. In some implementations, server access module 86 may merely interface with one or more other components of system 10 managing this information (e.g., the central information catalog discussed above). The network location generated by server access module 86 may be transmitted to client 16 to enable client 16 to access the appropriate server and begin receiving view information for a view of the virtual space correlated with client 16 by space correlation module 84.

As was mentioned previously, space access processor 17 enables system 10 to operate such that client 16 provides a view of a virtual space to the user of client 16 that is dependent (one or both of the virtual space and/or the view thereof) on the physical location of the user in the real world. As a non-limiting example, a given virtual space may be associated with a physical analogue that is (or corresponds to) a public place (e.g., a shop, a restaurant, a commons, an arena, a classroom, a social meeting place, etc.). When client 16 is being operated at the public place, space access processor 17 may direct client 16 to a server that is executing an instance of the given virtual space. In some implementations, the virtual space that corresponds to the public place may be designed to be viewed while being located at the public place. For example, views of the virtual space may include information that would not be available to people that are present at the public place without having access to views of the virtual space. Such information may include, for example, identifications of other people present at the public place (e.g., via an identification by the server executing an instance of the virtual space of the clients currently located at physical locations that correspond to the public place), special offers for goods and/or services being sold at the public place, listings of upcoming events at the public place, semantic tags, ratings, links to further info, avatars of uses not physically present at the physical analogue (e.g., remote users), and/or other information.

In some embodiments, client 16 may access a virtual space without being at a physical location that corresponds to a physical analogue of the virtual space. Views of this virtual space may provide the user of client 16 with information about conditions at the physical analogue without being physically present. In fact, in some implementations where client 16 is not physically present at the physical analogue, an object associated with client 16 (e.g., an avatar, etc.) may travel within the topography of the virtual space (which may correspond to physical topography at the physical analogue), and/or interact with objects in the virtual space that correspond to objects at or near the physical analogue (e.g., avatars associated with other clients that are physically present at the physical analogue). This type of access to the virtual space (where client 16 is not present at the physical analogue) may be reserved for users meeting certain criteria, or may be open to the public. The criteria determining whether a user that is not physically present at the physical analogue may access the virtual space may include, for example, administrative privileges, a paid subscription fee (e.g., in real or virtual currency), an admission fee (e.g., in real or virtual currency), an invitation to the virtual space, and/or other criteria.

In some implementations, upon initiating client 16, system 10 may operate in the above-described manner to provide the user with information (e.g., views of a virtual space) that is dependent on physical location in the real world. This feature may be mandatory (e.g., client 16 only provides physical location dependent views upon initiation) or voluntary (e.g., the user sets client 16 to provide only physical location dependent views upon initiation). In some implementations, after receiving physical location dependent views of a virtual space from client 16, the user may input a command to begin viewing another virtual space that is not associated with a physical analogue that corresponds to the physical location of client 16.

In some embodiments, physical analogues in the real world for separate virtual spaces may overlap. In such implementations, if client 16 is present at a physical location that corresponds to physical analogues associated with two or more virtual spaces, space correlation module 84 may correlate client 16 with one of the virtual spaces based on a predetermined hierarchy of virtual spaces. The predetermined hierarchy may be determined by administrators of system 10, agreements between entities associated with the virtual spaces (e.g., owners of the virtual spaces, owners of the physical objects and/or locations that are physical locations, etc.), a user preference for one or more virtual spaces, and/or otherwise determined. In some such implementations, the predetermined hierarchy may be determined by a plurality of factors (e.g., administrators of system 10, as modified by one or more user preferences). In some implementations, the predetermined hierarchy may specify a default virtual space, but one or more of the other overlapping virtual spaces may be accessed by client 16 in response to a command input at client 16 by the user (e.g., to enable "toggling" between virtual spaces associated with overlapping physical analogues).

In some embodiments, system 10 may enable the user to create a virtual space. In such embodiments, the user may select a set of characteristics of the virtual space on client 16 (e.g., via user interface display 48 and/or input interface 42). The characteristics selected by the user may include characteristics of one or more of a topography of the virtual space, the manifestation in the virtual space of one or more objects and/or unseen forces, an interface provided to users to enable the users to interact with the new virtual space, space parameters associated with the new virtual space, and/or other characteristics of the new virtual space.

In creating a virtual space, or at some point thereafter, the virtual space may be associated with one or more physical analogues. This association may be accomplished by the creating user(s), or some other party. In some implementations, the physical analogues to which a virtual space can be associated may be restricted. Similarly, one or more geographic locations may be "restricted" in that physical analogues are not permitted therein (at least not without appropriate permission). In such implementations, control over the association with virtual spaces of physical analogues (e.g., a list of possible physical analogues, physical analogues within a geographic area, etc.) may be given over to an entity based on privileges that are earned, bought, or otherwise distributed. By way of non-limiting example, a retailer may pay to control the association of one or more retail locations with virtual spaces.

Figure 3:
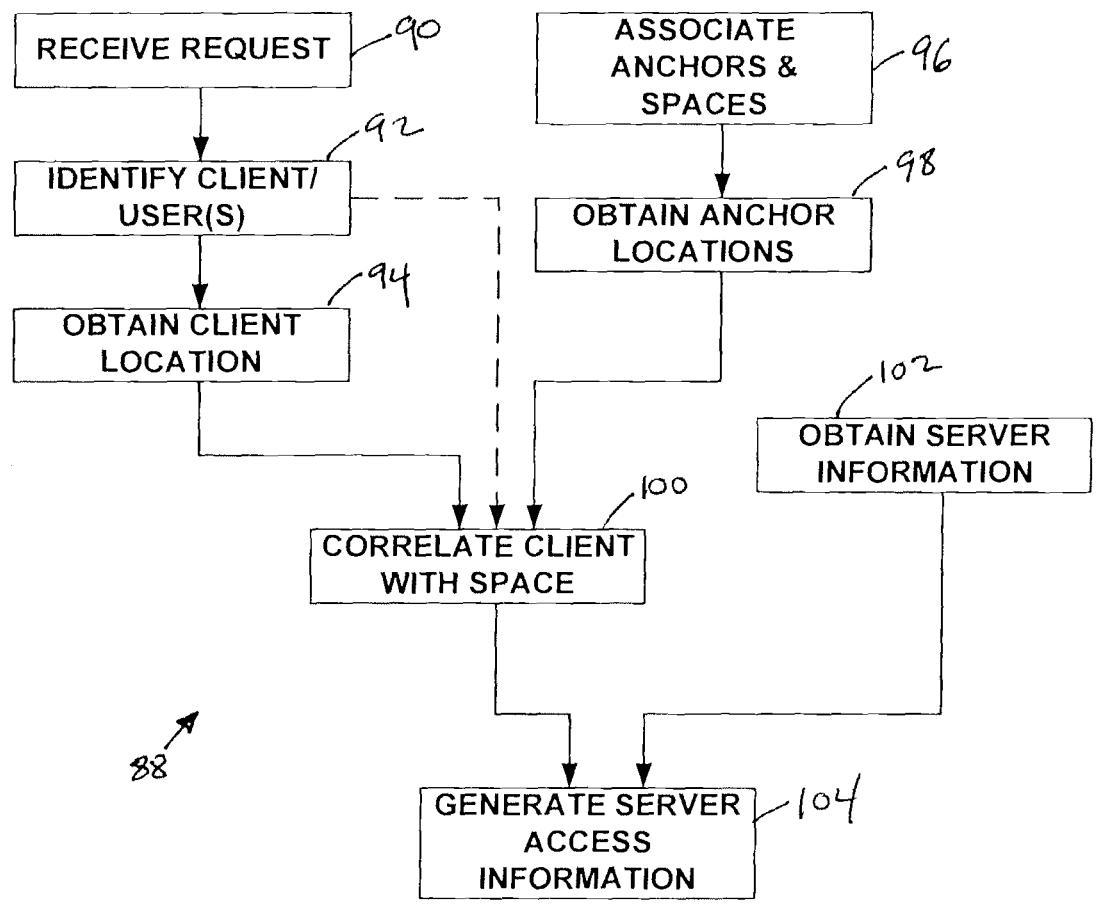
FIG. 3 illustrates a method of enabling access to a virtual space, in accordance with one or more embodiments of the invention.

FIG. 3 illustrates a method 88 of enabling access to a virtual space. In the description of method 88 and one or more of its operations below, specific reference is made to the components of system 10 (illustrated in FIG. 1 and described above). However, this should not be viewed as limiting. Instead, method 88 should be appreciated as being usable with a variety of systems. Further, the particular arrangement of the operations of method 88 illustrated in FIG. 3 and described hereafter is not intended to be limiting. In some implementations, various ones of the operations could be performed in an order other than the one set forth (or concomitantly with other ones of the operations), various ones of the operations may be combined with others and/or be omitted altogether, and/or various additional operations may be added without departing from the scope of the disclosure, as should be appreciated.

At an operation 90, a request may be received for access to a virtual space. The request may be received from a client, such as a client that is the same as or similar to client 16 (illustrated in FIG. 1 and described above). In some embodiments, operation 90 may be performed by a request module that is the same as or similar to request module 76 (illustrated in FIG. 1 and described above).

At an operation 92, the client from which the request was received at operation 90, or a user operating the client, may be identified. This may include identifying the client and/or the user (or group of users) from an identifier included in the request. The identification at operation 92 may, in some implementations, be a secure identification that requires the receipt of one or more passwords and/or tokens from the client to authenticate the identification. In some embodiments, operation 92 may be performed by a request module that is the same as or similar to request module 76 (illustrated in FIG. 1 and described above).

At an operation 94, a physical location of the client from which the request was received at operation 90 is obtained. This may include receiving a transmission of information related to the physical location of the client, and determining the physical location of the client from the received information. The information related to the physical location of the client may be received from the client, or from some other source. In some embodiments, operation 94 may be performed by a client location module that is the same as or similar to client location module 80 (illustrated in FIG. 1 and described above).

At an operation 96 one or more of a plurality of virtual spaces may be associated with physical analogues that are present in the real world. This may include associating individual ones of the virtual spaces with one or more physical analogues. As has been discussed above, physical analogues may include a physical place, a physical region, a physical object, and/or other physical entities in the real world.

At an operation 98, the locations of one or more of the physical analogues associated with the virtual spaces may be obtained. In some embodiments, operation 98 may be performed by a analogue location module that is the same as or similar to analogue location module 82 (illustrated in FIG. 1 and described above).

At an operation 100, the client from which the request was received at operation 90 may be correlated with a virtual space. The correlation of the client with a virtual space may be based on one or more of a physical location of the client in the real world, the physical locations of the physical analogues associated with the virtual spaces, user information (e.g., a user preference, a user privilege, a user subscription or membership, etc.) stored in a user profile associated with the client and/or user(s) identified at operation 92, and/or other information related to the client/user(s), the virtual spaces, and/or the physical analogues. In some embodiments, operation 100 may be performed by a space correlation module that is the same as or similar to space correlation module 84 (illustrated in FIG. 1 and described above).

At an operation 102, information related to servers executing instances of the virtual spaces may be obtained. The information obtained at operation 102 may include, for example, network locations at which the servers may be accessed, a listing of which servers are executing instances of which virtual spaces, and/or other information. For example, such information may be obtained from a storage module that is the same as or similar to storage module 12 (illustrated in FIG. 1 and described above).

At an operation 104, a network location at which the client will be able to access a server executing an instance of the virtual space that was correlated with the client at operation 100 is generated. Accessing the network location generated at operation 104 will enable the client to receive view information from a server that describes a view of an instance of the virtual space correlated with the client at operation 100. This view information may be assembled by the client to provide a displayed view of the virtual space to a user on the client. In some embodiments, operation 104 may be performed by a server access module that is the same as or similar to server access module 86 (illustrated in FIG. 1 and described above).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A server configured to provide access to virtual spaces based on current location in the real world, the server comprising:
   one or more processors configured to execute computer program modules, the computer program modules comprising:
      a request module configured to receive requests from client computing platforms for access to virtual spaces;
      a location module configured to obtain, in real time or near real time, a current location in the real world of a first client computing platform associated with a first user;
      a space correlation module configured to, responsive to reception of a request from the first client computing platform for virtual space access, correlate the current location in the real world of the first client computing platform with one of a plurality of virtual spaces by comparing the current real world location of the first client computing platform with the real world locations of physical analogues that are associated with the different virtual spaces, wherein the virtual spaces are separate simulated spaces, and wherein the virtual spaces comprise a first virtual space and a second virtual space; and
      a server access module configured to provide access for the first client computing platform to the virtual space with which the current location of the first client computing platform has been correlated such that, responsive to the current location of the first client computing platform being correlated with the first virtual space, access to the first virtual space is provided for the first client computing platform by facilitating communication between the first client computing platform and a space server executing an instance of the first virtual space, wherein such communication enables an avatar associated with the first client computing platform to be controlled within the instance of the first virtual space from the first client computing platform to interact in the instance of the first virtual space with avatars being controlled by other client computing platforms.

2. The system of claim 1, wherein the physical analogue associated with the first virtual space is either a physical location or a physical object in the real world.

3. The system of claim 1, wherein the physical analogue associated with the first virtual space is mobile in the real world.

4. The system of claim 1, wherein the server access module is further configured such that an initial view of the instance of the first virtual space received by the first client computing platform reflects the location of the first client computing platform in the real world.

5. The system of claim 4, wherein the server access module is further configured such that the initial view is from a point of view at a location in the instance of the first virtual space that corresponds to the location of the first client computing platform in the real world.

6. The system of claim 1, wherein the avatar controlled from the first client computing platform is a character associated with a user account that corresponds to a first user of the first client computing platform.

* * * * *